(12) United States Patent
Funke et al.

(10) Patent No.: US 7,406,822 B2
(45) Date of Patent: Aug. 5, 2008

(54) PARTICULATE TRAP REGENERATION SYSTEM AND CONTROL STRATEGY

(75) Inventors: Steven J. Funke, Mapleton, IL (US); Jason K. Bloms, Peoria, IL (US); Andrew A. Knitt, Deer Creek, IL (US); Chandini A. M. Ammineni, Peoria, IL (US); Michael P. Withrow, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 116 days.

(21) Appl. No.: 11/169,750

(22) Filed: Jun. 30, 2005

(65) Prior Publication Data
US 2007/0000241 A1 Jan. 4, 2007

(51) Int. Cl.
*F01N 3/00* (2006.01)
*F01N 3/02* (2006.01)

(52) U.S. Cl. .......................... 60/297; 60/311
(58) Field of Classification Search ............ 60/297, 60/311
See application file for complete search history.

(56) References Cited

U.S. PATENT DOCUMENTS

| | | | |
|---|---|---|---|
| 4,383,411 A | 5/1983 | Riddel | |
| 4,502,278 A | 3/1985 | Stark | |
| 4,534,173 A * | 8/1985 | Tsukamoto | 60/606 |
| 4,549,399 A * | 10/1985 | Usui et al. | 60/286 |
| 4,567,725 A | 2/1986 | Shinzawa et al. | |
| 4,581,891 A * | 4/1986 | Usui et al. | 60/286 |
| 4,581,981 A | 4/1986 | Kusiak | |
| 4,589,254 A | 5/1986 | Kume et al. | |
| 4,615,173 A * | 10/1986 | Usui et al. | 60/286 |
| 4,622,810 A | 11/1986 | Shinsei et al. | |
| 4,622,811 A | 11/1986 | Distel et al. | |
| 4,651,524 A | 3/1987 | Brighton | |
| 4,677,823 A | 7/1987 | Hardy | |
| 4,730,455 A | 3/1988 | Pischinger et al. | |
| 4,840,028 A | 6/1989 | Kusuda et al. | |
| 4,887,426 A | 12/1989 | Goerlich | |
| 4,912,920 A | 4/1990 | Hirabayashi | |
| 4,936,093 A | 6/1990 | Goerlich | |
| 4,944,153 A | 7/1990 | Goerlich et al. | |
| 4,951,464 A | 8/1990 | Eickhoff et al. | |
| 4,987,738 A | 1/1991 | Lopez-Crevillen et al. | |
| 5,038,562 A | 8/1991 | Goerlich | |
| 5,044,158 A | 9/1991 | Goerlich | |
| 5,052,178 A | 10/1991 | Clerc et al. | |
| 5,063,737 A | 11/1991 | Lopez-Crevillen et al. | |

(Continued)

FOREIGN PATENT DOCUMENTS

EP 1291514 3/2003

(Continued)

*Primary Examiner*—Thomas Denion
*Assistant Examiner*—Loren Edwards
(74) *Attorney, Agent, or Firm*—Finnegan, Henderson, Farabow, Garrett & Dunner (57) ABSTRACT

A particulate trap regeneration system is provided. The system may include a particulate trap configured to remove one or more types of particulate matter from an exhaust flow of an engine. The system may also include a regeneration device configured to reduce an amount of particulate matter in the particulate trap. The system may further include a controller configured to activate the regeneration device in response to the first to occur of at least three trigger conditions.

43 Claims, 4 Drawing Sheets

U.S. PATENT DOCUMENTS

| | | | | |
|---|---|---|---|---|
| 5,067,973 | A * | 11/1991 | Pattas | 95/12 |
| 5,079,917 | A | 1/1992 | Henkel | |
| 5,094,075 | A | 3/1992 | Berendes | |
| 5,140,814 | A | 8/1992 | Kreutmair et al. | |
| 5,211,009 | A * | 5/1993 | Houben et al. | 60/274 |
| 5,243,819 | A | 9/1993 | Woerner et al. | |
| 5,284,016 | A | 2/1994 | Stark et al. | |
| 5,287,698 | A | 2/1994 | Shinzawa et al. | |
| 5,347,809 | A | 9/1994 | Moeckel et al. | |
| 5,417,059 | A | 5/1995 | Härtel et al. | |
| 5,419,121 | A | 5/1995 | Sung et al. | |
| 5,456,079 | A | 10/1995 | Langen | |
| 5,458,673 | A | 10/1995 | Kojima et al. | |
| 5,511,413 | A * | 4/1996 | Pfister et al. | 73/118.1 |
| 5,572,866 | A | 11/1996 | Loving | |
| 5,771,683 | A | 6/1998 | Webb | |
| 5,826,428 | A | 10/1998 | Blaschke | |
| 5,829,248 | A | 11/1998 | Clifton | |
| 5,950,420 | A | 9/1999 | Geiger | |
| 6,003,305 | A * | 12/1999 | Martin et al. | 60/274 |
| 6,450,800 | B1 * | 9/2002 | Cash | 431/11 |
| 6,568,173 | B1 | 5/2003 | Kolmanovsky et al. | |
| 6,574,956 | B1 | 6/2003 | Moraal et al. | |
| 6,622,480 | B2 | 9/2003 | Tashiro et al. | |
| 6,675,583 | B2 | 1/2004 | Willis et al. | |
| 6,694,727 | B1 * | 2/2004 | Crawley et al. | 60/295 |
| 6,763,659 | B2 | 7/2004 | Watanabe et al. | |
| 6,829,890 | B2 * | 12/2004 | Gui et al. | 60/295 |
| 6,895,745 | B2 | 5/2005 | Roby | |
| 6,962,045 | B2 * | 11/2005 | Kitahara et al. | 60/295 |
| 6,969,413 | B2 * | 11/2005 | Yahata et al. | 55/282.3 |
| 6,978,604 | B2 * | 12/2005 | Wang et al. | 60/297 |
| 7,021,047 | B2 * | 4/2006 | Hilden et al. | 60/286 |
| 7,025,810 | B2 * | 4/2006 | Crawley et al. | 95/278 |
| 7,048,891 | B2 * | 5/2006 | Kinugawa et al. | 422/94 |
| 2003/0230076 | A1 | 12/2003 | Kwon | |
| 2004/0013579 | A1 | 1/2004 | Schaller | |
| 2004/0103654 | A1 | 6/2004 | Ohtake et al. | |
| 2004/0128985 | A1 | 7/2004 | Shimasaki et al. | |
| 2004/0134187 | A1 | 7/2004 | Inoue et al. | |
| 2004/0172935 | A1 | 9/2004 | Otake et al. | |
| 2004/0173090 | A1 | 9/2004 | Kondou et al. | |
| 2004/0194450 | A1 | 10/2004 | Tanaka et al. | |
| 2004/0204289 | A1 | 10/2004 | Inoue et al. | |
| 2004/0204818 | A1 | 10/2004 | Trudell et al. | |
| 2004/0211159 | A1 | 10/2004 | Hamahata et al. | |
| 2004/0226287 | A1 * | 11/2004 | Edgar et al. | 60/295 |
| 2004/0231324 | A1 | 11/2004 | Hirota et al. | |
| 2004/0237513 | A1 | 12/2004 | Bunting et al. | |
| 2005/0000209 | A1 | 1/2005 | Takahashi et al. | |
| 2005/0150221 | A1 * | 7/2005 | Crawley et al. | 60/295 |

FOREIGN PATENT DOCUMENTS

| | | |
|---|---|---|
| EP | 1333169 | 8/2003 |
| EP | 1384868 | 1/2004 |
| GB | 2402353 | 12/2004 |
| WO | WO 2004/076828 | 9/2004 |

* cited by examiner

PARTICULATE TRAP REGENERATION SYSTEM AND CONTROL STRATEGY

TECHNICAL FIELD

The present disclosure is directed to a particulate trap regeneration system and, more particularly, to a particulate trap regeneration system and control strategy.

BACKGROUND

Engines, including diesel engines, gasoline engines, natural gas engines, and other engines known in the art, may exhaust a complex mixture of air pollutants. The air pollutants may be composed of both gaseous and solid material, such as, for example, particulate matter. Particulate matter may include ash and unburned carbon particles called soot.

Due to increased environmental concerns, exhaust emission standards have become more stringent. The amount of particulate matter and gaseous pollutants emitted from an engine may be regulated depending on the type, size, and/or class of engine. In order to meet these emissions standards, engine manufacturers have pursued improvements in several different engine technologies, such as fuel injection, engine management, and air induction, to name a few. In addition, engine manufacturers have developed devices for treatment of engine exhaust after it leaves the engine.

Engine manufacturers have employed exhaust treatment devices called particulate traps to remove the particulate matter from the exhaust flow of an engine. A particulate trap may include a filter designed to trap particulate matter. The use of the particulate trap for extended periods of time, however, may enable particulate matter to accumulate on the filter, thereby causing damage to the filter and/or a decline in engine performance.

One method of restoring the performance of a particulate trap may include regeneration. Regeneration of a particulate trap filter system may be accomplished by thermal regeneration, which may include increasing the temperature of the filter and the trapped particulate matter above the combustion temperature of the particulate matter, thereby burning away the collected particulate matter and regenerating the filter system. This increase in temperature may be effectuated by various means. For example, some systems employ a heating element (e.g., an electric heating element) to directly heat one or more portions of the particulate trap (e.g., the filter material or the external housing). Other systems have been configured to heat the exhaust gases upstream from the particulate trap, allowing the flow of the heated gases through the particulate trap to transfer heat to the particulate trap. For example, some systems may alter one or more engine operating parameters, such as air/fuel mixture, to produce exhaust gases with an elevated temperature. Running an engine with a "rich" air/fuel mixture can elevate exhaust gas temperature. Other systems heat the exhaust gases upstream from the particulate trap, with the use of a burner that creates a flame within the exhaust conduit leading to the particulate trap.

Regeneration may be performed periodically as opposed to constantly. That is, after a trigger condition occurs, the thermal regeneration system may initiate regeneration in response to the trigger condition. Some systems are configured to initiate regeneration in response to a single type of trigger condition, such as the operation of the engine for a predetermined amount of time or a pressure characteristic of the exhaust system (e.g., backpressure in the exhaust system). Some systems are configured to initiate regeneration in response to two types of trigger conditions. For example, one such regeneration system is disclosed by U.S. Pat. No. 6,622,480 issued to Tashiro et al. on Sep. 23, 2003 ("the '480 patent"). The '480 patent discloses a regeneration system configured to initiate regeneration in response to the first of the following to occur: a predetermined backpressure upstream from the particulate trap or a particulate accumulation model (i.e., an estimation of the amount of soot accumulated in the particulate trap based on several factors).

The system of the '480 patent may be configured to initiate regeneration in response to two different trigger conditions, either of which may be indicative that a significant amount of particulate matter has accumulated in the particulate trap. However, the system of the '480 patent does not account for one or more additional parameters, independent of the two trigger conditions, that may be indicative of an accumulation of particulate matter in the particulate trap. For example, the '480 patent does not disclose that the regeneration system is configured to initiate regeneration in response to other potential trigger conditions, such as operation of the engine for a predetermined amount of time or a predetermined amount of fuel consumed.

The present disclosure is directed to improvements in existing particulate trap regeneration systems and control strategies.

SUMMARY OF THE INVENTION

In one aspect, the present disclosure is directed to a particulate trap regeneration system. The system may include a particulate trap configured to remove one or more types of particulate matter from an exhaust flow of an engine. The system may also include a regeneration device configured to reduce an amount of particulate matter in the particulate trap. The system may further include a controller configured to activate the regeneration device in response to the first to occur of at least three trigger conditions.

In another aspect, the present disclosure is directed to a method of regenerating a particulate trap. The method may include monitoring three aspects of an exhaust flow producing engine and an exhaust system configured to carry exhaust produced by the engine away from the engine. The method may also include activating a regeneration device configured to reduce an amount of particulate matter in a particulate trap configured to remove one or more types of particulate matter from the exhaust flow of the engine, in response to at least one of the three aspects being determined to meet a trigger condition.

DETAILED DESCRIPTION

Reference will now be made in detail to the drawings. Wherever possible, the same reference numbers will be used throughout the drawings to refer to the same or like parts.

Figure 1:
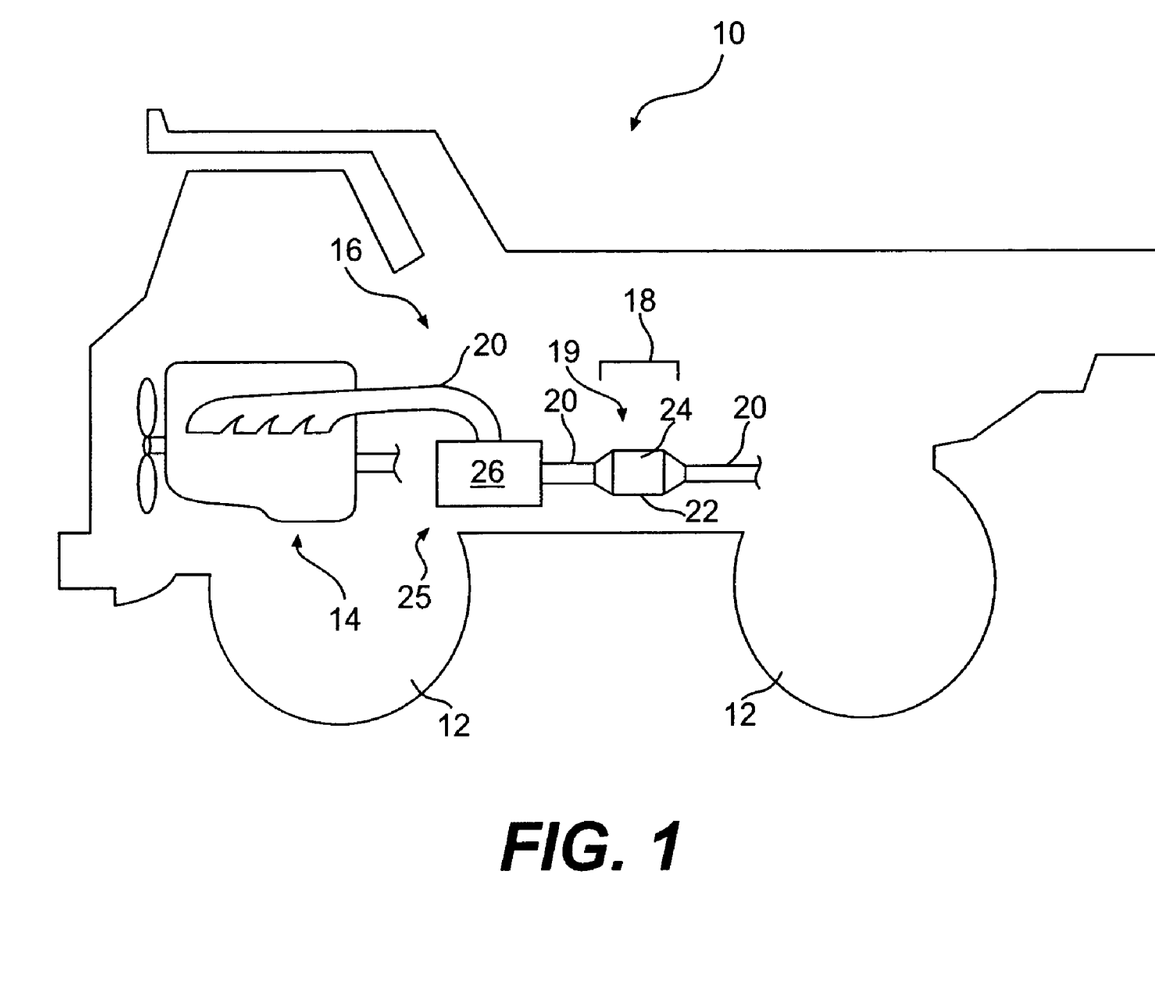
FIG. 1 is a diagrammatic illustration of a work machine according to an exemplary disclosed embodiment.

FIG. 1 illustrates a work machine 10. Work machine 10 may include an operator station 11, one or more traction devices 12, an engine 14, and a particulate trap regeneration system 16.

Although work machine 10 is shown as a truck, work machine 10 could be any type of machine having an exhaust producing engine. Accordingly, traction devices 12 may be any type of traction devices, such as, for example, wheels, as shown in FIG. 1, tracks, belts, or any combinations thereof.

Engine 14 may be any kind of engine that produces an exhaust flow of exhaust gases. For example, engine 14 may be an internal combustion engine, such as a gasoline engine, a diesel engine, a natural gas engine or any other exhaust gas producing engine.

Figure 2:
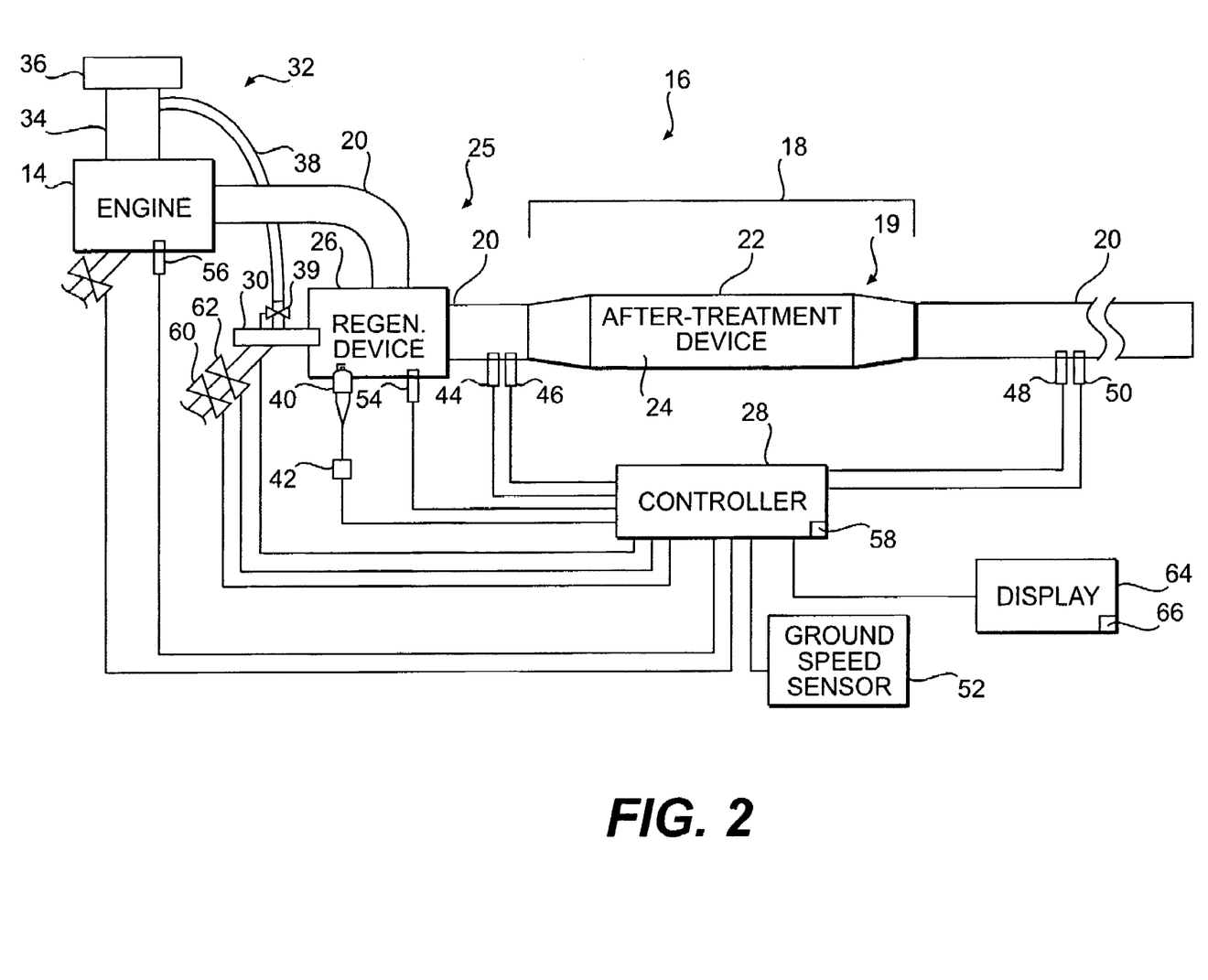
FIG. 2 is a diagrammatic illustration of a particulate trap regeneration system according to an exemplary disclosed embodiment.

System 16 may include an after-treatment device 18. After-treatment device 18 may be any type of device configured to remove one or more constituents from the exhaust flow of engine 14 and which may be regenerated by heat or some other measure. In one embodiment, after-treatment device 18 may include a particulate trap 19, as shown in FIG. 2. Particulate trap 19 may be configured to remove one or more types of particulate matter from the exhaust gases produced by engine 14 and flowing through an exhaust conduit 20 configured to direct all or a portion of the exhaust gases produced by engine 14 to after-treatment device 18. Particulate trap 19 may include an outer housing 22, which may encase a filter material 24 (e.g., a metal mesh) for trapping particulate matter.

Although after-treatment device 18 is discussed herein primarily as being a particulate trap, in other embodiments, after-treatment device 18 may include a catalytic converter, catalytic particulate trap, NOx adsorber, or any other after-treatment device that may be regenerated. Alternatively or additionally, after-treatment device 18 may include combinations of these devices. For example, after-treatment device 18 may include a particulate trap and catalytic converter in series, which, in some embodiments, may be integrated into the same unit (e.g., in the same housing).

After-treatment device 18 may be configured to be thermally regenerated. That is, regeneration of after-treatment device 18 may be accomplished by increasing the temperature of after-treatment device 18. Such increases in temperature of after-treatment device 18 may be generated in a number of different ways. For example, heat may be directly applied to after-treatment device 18 via a heating device integral with or adjacent to after-treatment device 18, such as an electric heating element (not shown). Alternatively or additionally, the temperature of after-treatment device 18 may be increased by heat transferred to it from the exhaust gases flowing through it. In such embodiments, heat may be applied to exhaust gases upstream from after-treatment device 18.

The temperature of the exhaust gases may be increased in one or more ways. For example, altering engine parameters may have an effect on exhaust gas temperature. Running engine 14 with a "rich" air/fuel mixture may increase exhaust gas temperature. Increases in engine load may also increase exhaust gas temperature. Exhaust gases may also be heated by post injection, which involves injecting additional fuel into the combustion chambers after the combustion has taken place, which may result in the additional fuel being burned in the exhaust system, thereby elevating the temperature of the exhaust gases in the system. Exhaust temperature may also be raised by heating the exhaust gases or exhaust conduit 20. For example, an electric heating element and/or flame producing burner may be configured to heat the exhaust gases or exhaust conduit 20.

In one embodiment, system 16 may include a regeneration device 25 configured to reduce an amount of particulate matter in after-treatment device 18. For example, regeneration device 25 may include a burner assembly 26 configured to increase the temperature of the exhaust gases flowing through exhaust conduit 20 upstream from after-treatment device 18. Burner assembly 26 may be configured to maintain or restore the performance of after-treatment device 18 through thermal regeneration. Accumulation of exhaust flow constituents in after-treatment device 18 may result in a decline in engine performance and/or possible damage to after-treatment device 18 and/or other components of system 16. Burner assembly 26 may be configured to prevent or restore any decline in engine performance and avoid possible damage to after-treatment device 18 and/or other components of system 16. For example, burner assembly 26 may be configured to cause at least some of the particulate matter that may have accumulated in after-treatment device 18 to be burned off.

Although system 16 is shown with a single after-treatment device 18 and a single regeneration device 25, system 16 may include more than one after-treatment device 18 and/or more than one regeneration device 25. For example, in one embodiment, system 16 may include a single regeneration device 25 configured to regenerate two after-treatment devices. In another embodiment, system 16 may include two regeneration devices configured to regenerate two after-treatment devices. In such an embodiment, each regeneration device may be configured to regenerate one of the after-treatment devices or contribute to the regeneration of both of the after-treatment devices. System 16 could also include any number of regeneration devices and/or after-treatment devices in any combination suitable for regeneration.

FIG. 2 illustrates an exemplary embodiment of exhaust treatment system 16. For purposes of the following explanation, after-treatment device 18 will be discussed as being particulate trap 19, while regeneration device 25 will be discussed as being burner assembly 26. However, it should be noted that after-treatment device 18 and regeneration device 25 could be any of the disclosed types of after-treatment and regeneration devices mentioned above. System 16 may also include a controller 28 configured to receive information from various sources and control one or mote components of system 16 based on this information.

Burner assembly 26 may be positioned anywhere along exhaust conduit 20 between engine 14 and particulate trap 19. Burner assembly 26 may include a fuel injector 30 configured to supply fuel to burner assembly 26. Burner assembly 26 may be configured to create a flame, which may be in a heat exchange relationship with the exhaust flow. System 16 may be configured to supply fuel injector 30 with fresh air for mixing with the fuel for combustion, as well as for flushing fuel injector 30 of any fuel or debris before and/or after operation of burner assembly 26.

System 16 may be configured to supply fresh air to fuel injector 30, to be mixed with fuel for combustion in burner assembly 26, wherein the source of the fresh air is an air intake system 32 of engine 14. That is, air may be routed from a portion of air intake system 32, such as an intake manifold 34, downstream from a compressor 36 configured to create forced induction for engine 14. Compressor 36 may include a turbocharger, supercharger, or any other device configured to compress intake air and thereby produce forced induction for engine 14. Air may be directed from intake manifold 34 to fuel injector 30 via an air conduit 38. The supply of air to fuel injector 30 may be regulated by an air valve 39, controllable by controller 28.

System 16 may be configured to operate in a pilot mode under various engine operating conditions, such as during rapid engine acceleration or rapid engine deceleration, to prevent the flame from being extinguished. In pilot mode, fuel injector 30 may deliver a predetermined mixture of air and fuel to burner assembly 26. For example, the mixture of air and fuel maybe different from the mixture delivered while the engine is operating at a substantially steady speed.

Burner assembly 26 may also include a spark plug 40 configured to provide spark to ignite the air/fuel mixture delivered by fuel injector 30. Current may be supplied to spark plug 40 by an ignition coil 42, which may be controllable by controller 28. Although burner assembly 26 has been shown and described as including spark plug 40, alternative ignition sources may be employed, such as, for example, glow plugs or any other means for igniting an air/fuel mixture.

Controller 28 may include any means for receiving work machine operating parameter-related information and/or for monitoring, recording, storing, indexing, processing, and/or communicating such information. These means may include components such as, for example, a memory, one or more data storage devices, a central processing unit, or any other components that may be used to run an application. Although aspects of the present disclosure may be described generally as being stored in memory, one skilled in the art will appreciate that these aspects can be stored on or read from types of computer program products or computer-readable media, such as computer chips and secondary storage devices, including hard disks, floppy disks, optical media, CD-ROM, or other forms of RAM or ROM. Various other known circuits may be associated with controller 28, such as power supply circuitry, signal-conditioning circuitry, solenoid driver circuitry, communication circuitry, and other appropriate circuitry.

Controller 28 may be configured to activate regeneration device 25 in response to the first to occur of at least three trigger conditions. That is, controller 28 may monitor for at least three trigger conditions, and if any of them are met, then controller 28 may activate regeneration device 25. The trigger conditions may include, for example, operation of engine 14 for a predetermined amount of time; consumption of a predetermined amount of fuel by engine 14; detection of an elevated backpressure upstream of particulate trap 19 above a predetermined pressure; detection of a pressure differential across particulate trap 19 of greater than a predetermined amount; and determination that a calculated amount of particulate matter accumulated in particulate trap 19 is above a predetermined amount.

Regeneration may also be initiated manually by an operator, owner, service technician, etc. of work machine 10. Manually triggering regeneration may be accomplished via a switch, button, or the like associated with work machine 10 and/or a service tool configured to interface with work machine 10.

System 16 may include various sensors configured to generate information about operating parameters of system 16. Such information may be received by controller 28. For example, system 16 may include an upstream temperature sensor 44, an upstream pressure sensor 46, a downstream temperature sensor 48, and a downstream pressure sensor 50. Such sensors may be positioned along exhaust conduit 20 upstream and downstream from particulate trap 19 respectively and configured to take measurements of the temperature and pressure of the exhaust gases within exhaust conduit 20 at their respective locations. Such measurements may be received by controller 28.

Upstream pressure sensor 46 and downstream pressure sensor 50 may constitute a pressure differential measurement system. Such a system may be configured to measure a pressure differential between an upstream pressure of the exhaust flow upstream from particulate trap 19 and a downstream pressure of the exhaust flow downstream from particulate trap 19. Alternatively, in lieu of upstream pressure sensor 46 and downstream pressure sensor 50, the pressure differential measurement system may include a single pressure differential sensor (not shown) configured to measure the difference in pressure between the exhaust flow upstream and downstream of particulate trap 19.

System 16 may also include a ground speed sensor 52 configured to monitor the ground speed of work machine 10 (i.e., the speed of work machine 10 relative to the surface over which it travels). System 16 may also be provided with a flame sensing system associated burner assembly 26 and configured to detect whether burner assembly 26 is currently producing a flame. Such a flame sensing system may include, for example, a flame sensor 54. In addition, system 16 may include an engine speed sensor 56 configured to measure the speed at which engine 14 is operating (i.e., rpm).

The aforementioned sensors may include any type of sensing means suitable for monitoring their respective parameters. In particular, flame sensor 54 may include any type of sensor suitable for detecting the presence of a flame, such as temperature sensors (e.g., thermocouples), optical sensors, ultraviolet sensors, and ion sensors. Flame sensor 54 may be configured to detect a condition (e.g., temperature, ultraviolet light, ions, etc.) in proximity to the flame. Such a condition may be monitored at any location within close enough proximity to the flame to enable the presence of the flame to be detected. Additionally or alternatively, the flame sensing system may be configured to detect a rate of change in the condition. For example, a temperature in proximity to the flame location that is increasing at a predetermined rate may indicate that a flame is lit and causing the increase In addition or as an alternative to flame sensor 54, the flame sensing system may be configured to determine whether the downstream exhaust temperature measured by downstream temperatures sensor 48 exceeds the upstream exhaust temperature measured by upstream temperature sensor 44 by a predetermined amount. A significantly higher downstream temperature may indicate that the flame is lit and thus heating exhaust gases as they flow through burner assembly 26.

Controller 28 may include a timing device 58. Controller 28 may be configured to couple information from timing device 58 with information from other sources. For example, controller 28 may utilize information from timing device 58 in conjunction with information regarding operation of engine 14 (e.g., from engine speed sensor 56) to determine how long engine 14 is operated. Timing device 58 may also be used to monitor and control duration of regeneration events or any other operating parameters of system 16 and/or work machine 10.

System 16 may be configured to control one or more additional system functions and/or parameters. Controller 28 may be configured to control the pressure of the fuel delivered to fuel injector 30 (and therefore the rate of fuel injection). A fuel on/off valve 60, which may be controllable by controller 28, may be associated with fuel injector 30 to selectively allow fuel to be delivered to fuel injector 30. In addition to fuel on/off valve 60, system 16 may also include a fuel pressure regulator valve 62 controllable by controller 28 to regulate the pressure of the fuel, and thereby the rate at which fuel is delivered to fuel injector 30. In some embodiments, controller 28 may be configured to control the pressure of fuel delivered to fuel injector 30 in a closed loop fashion, i.e., in response to pressure measurements taken at or near fuel injector 30 (e.g., by a fuel pressure sensor, not shown).

Controller 28 may be further configured to control fuel on/off valve 60 and/or fuel pressure regulator valve 62 (i.e., flow of fuel to fuel injector 30) in response to other parameters of system 16. For example, controller 28 may be configured to control the temperature of exhaust gases entering particulate trap 19 in response to feedback from upstream temperature sensor 44. This upstream exhaust temperature may be controlled by regulating the amount of fuel and/or air supplied to fuel injector 30, which may be accomplished by controlling fuel on/off valve 60 and/or fuel pressure regulator valve 62. Other types of regeneration devices or methods may be controlled in response to measurements taken by upstream temperature sensor 44. For example, the amount of post injection may be varied (e.g., by controller 28) to control the temperature of the exhaust gases entering any kind of aftertreatment device 18.

System 16 may include multiple fuel pressure regulator valves, which may be independently controlled. At least one fuel pressure regulator valve 62 may be configured to regulate main fuel pressure, and a second fuel pressure regulator valve (not shown) may be configured to regulate pilot fuel pressure. Pilot fuel pressure may be used during a pilot mode in which system 16 utilizes a predetermined air/fuel mixture to prevent flameouts during various engine operating conditions, e.g., hard accelerations and rapid decelerations.

Other operating parameters of system 16 may be monitored to maintain and/or optimize control of the regeneration process. For example, downstream temperature sensor 48 may detect whether downstream exhaust temperature is above a predetermined temperature. If downstream exhaust temperatures get too high, it could be an indication that temperatures within particulate trap 19 may be at an undesirably high level as well and/or that the regeneration may be somewhat unstable (e.g., incineration of soot and/or a catalyst driven reaction may be intensifying within after-treatment device 18 beyond a level commanded by controller 28).

System 16 may also be configured to monitor the stability of the regeneration process by determining a difference between the upstream exhaust temperature measured by upstream temperature sensor 44 and the downstream exhaust temperature measured by downstream temperature sensor 48. If the temperature measured by downstream temperature sensor 48 exceeds that measured by upstream temperature sensor 44 by more than a predetermined amount for more than a predetermined amount of time, controller 28 may initiate steps to scale back or terminate the regeneration process. For example, in such a case, controller 28 may reduce the intensity of the flame produced by burner assembly 26. In some circumstances, controller 28 may terminate the regeneration process if the regeneration process is significantly unstable (e.g., if the downstream exhaust temperature exceeds a predetermined value or it exceeds the upstream exhaust temperature by more than a predetermined amount).

Controller 28 may be configured to log faults when the downstream exhaust temperature exceeds a predetermined temperature or when the downstream exhaust temperature exceeds the upstream exhaust temperature by more than a predetermined amount. Controller 28 may also be configured to terminate the regeneration process if the number of faults reaches a predetermined value (e.g., when three faults have occurred). Otherwise, controller 28 may initiate a start-up sequence.

System 16 may include a display 64. Display 64 may be located at any suitable location on work machine 10, such as, for example, in operator station 11. Display 64 may be any kind of display, including screen displays, such as, for example, cathode ray tubes (CRTs), liquid crystal displays (LCDs), plasma screens, and the like. Display 64 may be configured to display information about operating parameters of system 16. For example, display 64 may include a warning indicator 66 (e.g., a warning lamp, warning message, etc.). Controller 28 may be configured to illuminate warning indicator 66 upon detection of the predetermined amount of faults. As an alternative or in addition to display 64, system 16 may include one or more audible alerts for conveying information about operating parameters of system 16 to an operator. In addition to providing visual feedback regarding operating parameters of system 16, display 64 may also be configured to display other information regarding system 16 or any other device and/or system associated with work machine 10. Display 64 may also be configured to indicate when a regeneration event is occurring or about to occur.

Figure 3A:
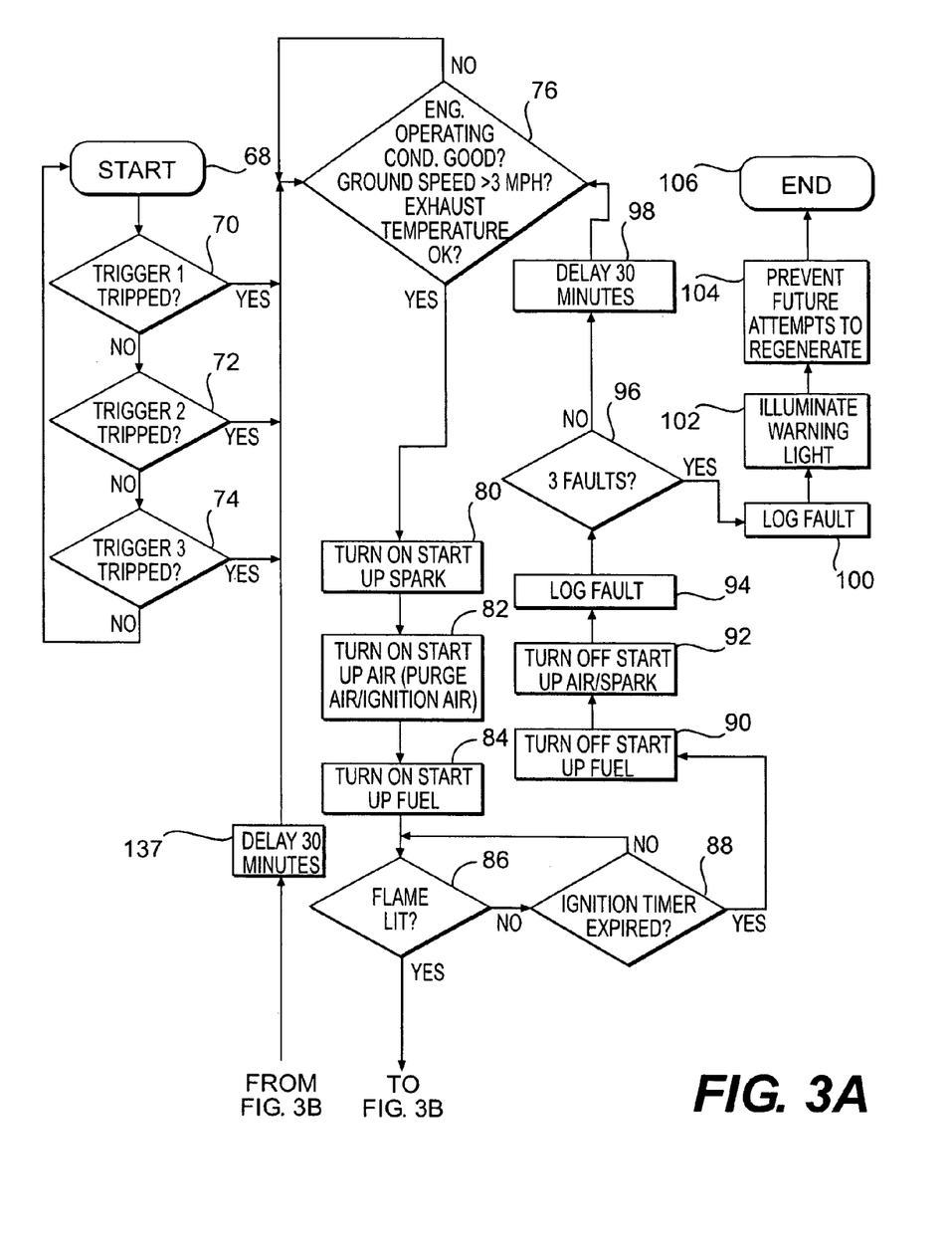
FIG. 3A is a flowchart representation of a control strategy for a particulate trap regeneration system according to an exemplary disclosed embodiment.
Figure 3B:
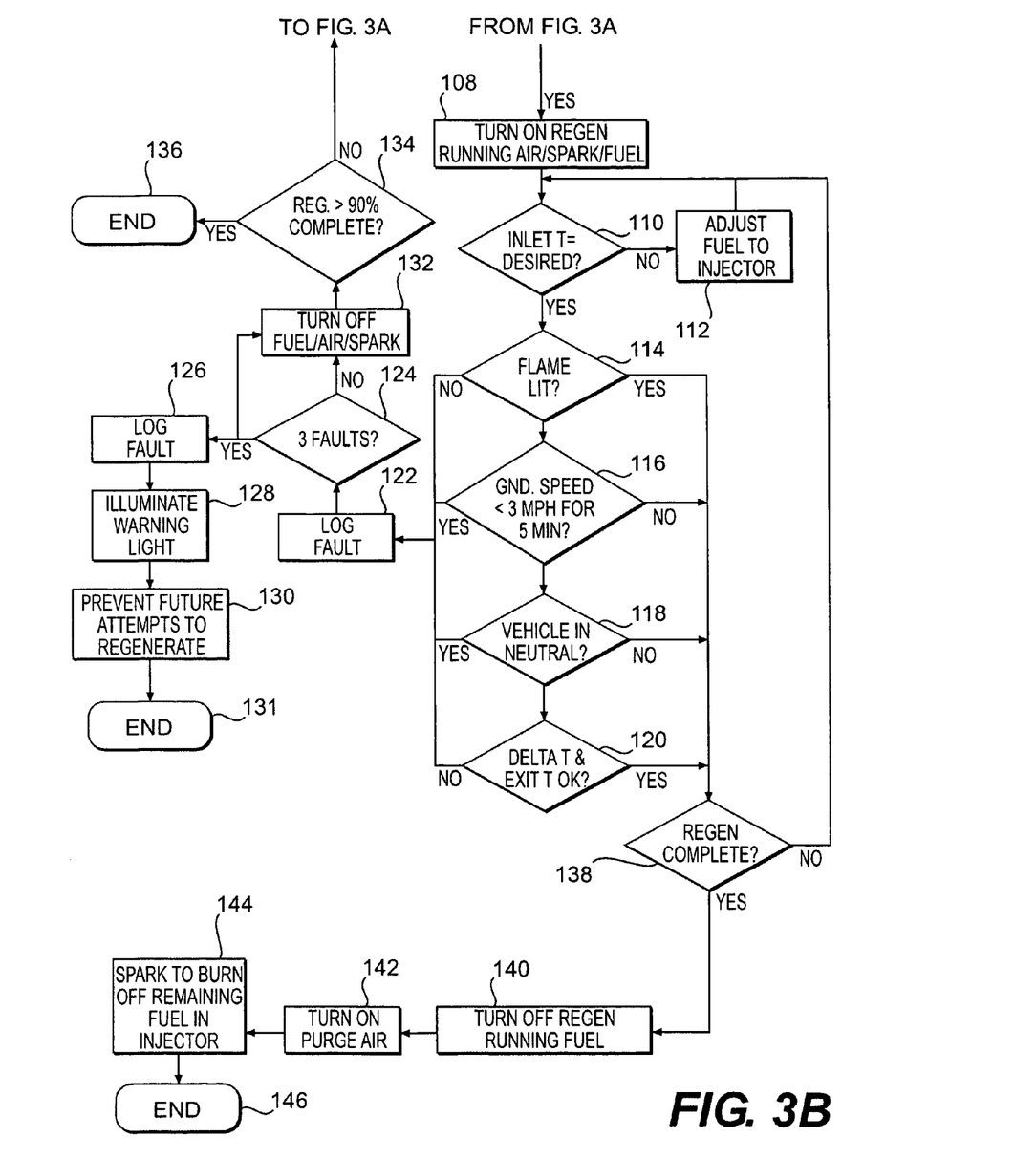
FIG. 3B is a continuation of the flowchart representation illustrated by FIG. 3A.

FIG. 3 illustrates an exemplary control strategy for operation of system 16. The exemplary control strategy shown in FIG. 3 will be discussed in greater detail below.

INDUSTRIAL APPLICABILITY

The disclosed particulate trap regeneration system 16 may be suitable to enhance exhaust emissions control for engines. System 16 may be used for any application of an engine. Such applications may include, for example, stationary equipment such as power generation sets, or mobile equipment, such as vehicles. The disclosed system may be used for any kind of vehicle, such as, for example, automobiles, work machines (including those for on-road, as well as off-road use), and other heavy equipment.

An exemplary control strategy is set forth in FIG. 3A and 3B. The control strategy for system 16 may execute on a continual loop or on a periodic basis. Referring to FIG. 3A, the control strategy may start (step 68) and system 16 may proceed to monitor whether any of a multitude of triggers have been tripped (i.e., the trigger condition is met). For example, in a system having 3 triggers, as shown in FIG. 3, the strategy may determine whether trigger 1 has been tripped (step 70), if not, then the strategy may proceed to ask whether trigger 2 has been tripped (step 72), and if not, then whether trigger 3 has been tripped (step 74). If trigger 3 has not been tripped, then the strategy may loop back to START (step 68), and begin again so as to execute on a continual loop. Although these inquiries of whether the triggers have been tripped are shown and described as being in series, the inquiries may be made in parallel (e.g., each inquiry made substantially simultaneously).

If any of triggers 1, 2, or 3 have been tripped, the strategy may proceed to solicit information from system 16 about whether the operating conditions of engine 14 (e.g., engine speed, load, coolant temperature, etc.) are conducive to regeneration (step 76). In addition, step 76 may determine whether the ground speed of work machine 10 is above three miles per hour (mph) and whether the temperature of the exhaust produced by engine 14 is at a level conducive to regeneration. If one of these parameters and/or conditions falls out of spec (i.e., are not conducive to regeneration), then the strategy may repeat step 76 until such conditions are in spec (i.e., conducive to regeneration). It should be noted that the threshold ground speed for step 76 may be any predetermined speed, and may variable. In addition, such variability may be selectable. Although not illustrated, the inquiries of step 76 may also include a determination of whether the transmission of work machine 10 is in neutral and/or whether the parking brake is engaged. If the transmission of work machine 10 is in neutral or the parking brake is engaged, then regeneration may be prevented.

If these parameters and/or conditions are determined to be conducive to regeneration, then the strategy may proceed to step 80, wherein system 16 may be prompted to turn on start-up spark (e.g., firing of spark plug 40 at a rate and power level suitable for initial start-up, i.e., ignition of a flame). In addition, at step 82, system 16 may turn on start-up air (e.g., air flow to fuel injector 30 suitable for initial start-up, i.e. ignition of a flame), e.g., to purge fuel injector 30, and for ignition of a flame fueled by fuel injector 30. At step 84, system 16 may turn on start-up fuel (fuel supplied at a rate suitable for initial start-up, i.e., ignition of a flame).

System 16 may monitor ignition by determining whether the burner flame is lit (step 86). If not, then the strategy may determine whether an ignition timer has expired (step 88). If not, then the strategy may loop back to step 86 to determine whether the flame has been lit. A delay (not illustrated) may be implemented before making the inquiry again. If the ignition timer has expired, then the strategy may initiate a shut down sequence, including turning off the start-up fuel (step 90), turning off start-up air and spark (step 92), and logging a fault to document the failed ignition (step 94). Additionally or alternatively, step 94 may include incrementing a "failed to ignite" counter.

At step 96, the strategy may also determine whether the fault has been logged more than once (e.g., three times, as shown in FIG. 3A). In one embodiment, step 96 may determine whether the "failed to ignite" counter is above a predetermined limit (e.g., a count of 2). If not, then after a delay (e.g., 30 minutes; step 98), the strategy may loop back to step 76 to attempt another start-up (i.e., ignition). If, however, the fault has been logged more than once (three times in this example), then another fault may be logged (step 100), a warning light may be illuminated (step 102), system 16 may prevent future attempts to regenerate (step 104), and the strategy may end (step 106).

Returning to step 86, if a flame is detected to be lit, then, proceeding to FIG. 3B, at step 108, system 16 may turn on regeneration running air, spark, and fuel (e.g., air, spark, and fuel, suitable for continual regeneration, as opposed to start-up or shut down). System 16 may also be configured to control the temperature of exhaust gases at the inlet of after-treatment device 18. At step 110, the strategy may inquire as to whether the inlet temperature is as desired. If not, then the amount (e.g., the rate) of fuel delivered to fuel injector 30 may be adjusted by system 16 (step 112) and step 110 may be repeated. Alternatively, the strategy may proceed without checking the inlet temperature again after an adjustment to the fuel delivery rate.

If the inlet temperature is determined to be as desired, then system 16 may proceed to monitor a series of additional parameters while the regeneration process is running. The strategy may check for flameouts (i.e., unintended extinguishing of the flame) by inquiring whether the flame is lit (step 114). The strategy may also check whether the ground speed of work machine 10 has been less than a predetermined threshold speed for a predetermined amount of time (e.g., less than 3 mph for at least 5 minutes; step 116). The threshold speed and duration may be any suitable values. The threshold speed and duration may also be adjustable. In addition, the strategy may determine whether the transmission of work machine 10 is in neutral (step 118). Although not shown in step 118, the strategy may also determine whether a parking brake is engaged such that regeneration is halted if the parking brake is engaged. Further, the strategy may determine whether the exit temperature, as well as the difference between the inlet temperature and the exit temperature (delta T) are within a predetermined range (step 120).

These parameters may be monitored in parallel (e.g., as shown in FIG. 3B) or in series. If any of these parameters are determined to be out of spec. (i.e., if the flame is determined to not be lit, the ground speed is determined to have been less than 3 mph for at least 5 minutes, work machine 10 is determined to be in neutral, and/or the exit temperature (delta T) are determined to be outside the predetermined range), then a fault may be logged (step 122). In certain embodiments, only select parameters may generate faults when out of spec. If the fault is determined to have been logged multiple times (e.g., three times as in this example; step 124), then another fault code may be logged (step 126), a warning light may be illuminated (step 128), future attempts to regenerate may be prevented (step 130), and the strategy may end (step 131).

Regardless of whether the fault has occurred more than once, the strategy may proceed to turn off fuel, air, and spark (step 132). The strategy may then inquire whether the regeneration process is more than a predetermined percentage complete (e.g., 90%; step 134). If so, then the regeneration and strategy may end (step 136). If not, then the strategy may delay (e.g., for 30 minutes; step 137; see FIG. 3A), loop back to step 76, and initiate an attempt to start-up a new regeneration cycle. The strategy may delay before proceeding to attempt to restart a new regeneration cycle. In certain embodiments, the one or more steps executed upon detection of a fault condition (i.e., parameters out of spec) may be performed in a different order. For example, step 134 may be performed prior to step 122. That is, the strategy may determine if regeneration is more than 90% complete before logging the fault.

Returning to the monitoring of parameters during the regeneration process (steps 114-120; FIG. 3B), if all the monitored parameters are within spec, the strategy may determine if the regeneration is complete (step 138). If not, then the strategy may loop back to step 110 to continue monitoring the regeneration parameters. System 16 may determine whether a regeneration is complete by, for example, monitoring whether a regeneration timer has expired. In other embodiments, a model may be utilized to determine a custom regeneration intensity and/or duration based on various criteria. In some embodiments, a parameter may be rechecked at one or more times during the regeneration. These parameters may include, for example, backpressure and/or a pressure differential (e.g., the difference in pressure between exhaust upstream versus downstream of particulate trap 19). If the backpressure or pressure differential exceed a predetermined threshold, then a regeneration procedure may be determined to be complete.

If the regeneration is determined to be complete, then a shut down procedure may be initiated. System 16 may turn off the regeneration running fuel (step 140), turn on purge air (i.e., air supplied to the fuel injector 30 to clear away any debris or remaining fuel; step 142), turn on spark suitable to burn off any remaining fuel in fuel injector 30 (step 144), and the regeneration and strategy may end (step 146). System 16 may determine the completion of the regeneration process in several ways. In one embodiment, the regeneration may be executed for a particular time period. In certain embodiments, the time period may be variable. Such variable time periods may be manually or automatically chosen (e.g., based on various operating parameters of engine 14 and system 16).

The disclosed system and control strategy may provide for reliable monitoring of soot loading within particulate filter 19 because at least three trigger conditions may be monitored during operation of the system. The following is a discussion of the interaction of several types of trigger mechanisms. While the following discussion mentions embodiments having certain types of triggers, the discussion should be taken as exemplary as any combination of triggers may be utilized.

In some embodiments, a simple time trigger (e.g., engine operation time) may provide the utmost reliability as no physical characteristics need to be sensed to monitor such a trigger condition. However, depending on other factors, soot loading in particulate trap 19 may reach a level warranting regeneration at an earlier time than the interval at which the time trigger is set. In such a situation, system 16 may, in some embodiments, calculate the amount of soot likely to be loaded in particulate trap 19 based on various parameters of engine 14 and system 16. For example, if engine 14 is operated under high loads during a particular interval, soot loading may be higher, thus, potentially warranting more frequent regeneration of particulate trap 19.

Further, if excessive soot loading occurs due to some factors not accounted for in the calculation, then a backpressure or pressure differential trigger may be configured to monitor for relatively higher levels of soot loading. Thus, in such cases where a calculation or other type of trigger condition do not indicate that a regeneration is warranted, a backpressure or pressure differential trigger may trigger regeneration to remedy excessive soot loading even before a time trigger condition is met. If, for whatever reason, none of the triggers that monitor physical parameters indicate that a regeneration is warranted, then the time trigger may serve to insure that regeneration occurs at relatively conservative intervals. Further, regeneration may be triggered manually if, for whatever reason, no other trigger conditions are determined to be met, but an operator, owner, service technician, etc. deems that a regeneration may be appropriate based on their own observations.

It will be apparent to those having ordinary skill in the art that various modifications and variations can be made to the disclosed particulate trap regeneration system and control strategy without departing from the scope of the invention. Other embodiments of the invention will be apparent to those having ordinary skill in the art from consideration of the specification and practice of the invention disclosed herein. It is intended that the specification and examples be considered as exemplary only, with a true scope of the invention being indicated by the following claims and their equivalents.

What is claimed is:

1. A particulate trap regeneration system, comprising:
   a particulate trap configured to remove one or more types of particulate matter from an exhaust flow of an engine;
   a regeneration device configured to reduce an amount of particulate matter in the particulate trap; and
   a controller configured to activate the regeneration device in response to the first to occur of at least three trigger conditions;
   wherein each of the at least three trigger conditions is associated with a separate, individual operating parameter of the regeneration system;
   wherein each individual operating parameter is indicative of an amount of particulate matter in the particulate trap and is associated with a separate, individual, predetermined threshold; and
   wherein, for each of the at least three trigger conditions, the respective trigger condition exists when the respective individual operating parameter that is associated with the respective trigger condition is at, or beyond, the predetermined threshold associated with the respective individual operating parameter.

2. The system of claim 1, wherein the at least three trigger conditions are selected from the group consisting of operation of the engine for a predetermined amount of time; consumption of a predetermined amount of fuel by the engine; detection of an elevated backpressure upstream of the particulate trap above a predetermined pressure; detection of a pressure differential across the particulate trap of greater than a predetermined amount; determination that a calculated amount of particulate matter accumulated in the particulate trap is above a predetermined amount; and activation of a manual trigger.

3. The system of claim 1, wherein the activation of the regeneration device is further conditional on one or more engine operating parameters.

4. The system of claim 3, wherein the one or more engine operating parameters include at least one of engine speed and engine load.

5. The system of claim 1, wherein the regeneration device is configured to elevate a temperature of the particulate trap.

6. The system of claim 5, further including:
   an upstream temperature sensor configured to measure a first temperature of the exhaust flow upstream from the particulate trap; and
   a downstream temperature sensor configured to measure a second temperature of the exhaust flow downstream from the particulate trap;
   wherein the controller is configured to compare the first temperature with the second temperature and generate a fault code if the second temperature exceeds the first temperature by more than a predetermined amount.

7. The system of claim 6, wherein the controller is configured to illuminate a warning light and prevent future regeneration attempts if the fault code is generated more than a predetermined number of times.

8. The system of claim 5, wherein the regeneration device includes a burner assembly having a fuel injector and being configured to create a flame, which is in a heat exchange relationship with the exhaust flow.

9. The system of claim 8, further including:
   a flame sensing system associated with the burner assembly and configured to detect whether the flame is lit;
   wherein the flame sensing system includes at least one of the following:
      a flame sensor selected from the group consisting of a temperature sensor and an ion sensor, wherein the flame sensing system is configured to measure at least one of:
         a condition in proximity to the flame; and
         a rate of change of a condition in proximity to the flame; and
      an upstream temperature sensor configured to measure an upstream exhaust temperature upstream of the burner assembly and a downstream temperature sensor configured to measure a downstream exhaust temperature downstream of the burner assembly, the flame sensing system being configured to determine whether the downstream exhaust temperature exceeds the upstream exhaust temperature by a predetermined amount.

10. The system of claim 8, wherein the system is further configured to flush the fuel injector with fresh air at one or more of the following times to clear the fuel injector of any debris or unburned fuel:
    prior to ignition of the flame; and
    subsequent to the flame being extinguished.

11. The system of claim 8, wherein the system is further configured to cool the fuel injector while the flame is not lit.

12. The system of claim 8, wherein the system is further configured to supply air to the fuel injector to be mixed with fuel for combustion in the burner assembly, and wherein the source of the air is the air intake system of the engine downstream from a compressor configured to create forced induction for the engine.

13. The system of claim 8, wherein the system is further configured to operate an ignition source at various times during operation of the system, including after the flame has been extinguished, to ignite fuel delivered to the burner by the fuel injector and to ignite any unburned fuel in the fuel injector after the flame has been extinguished.

14. The system of claim 8, wherein the system is further configured to regulate pressure of fuel supplied to the fuel injector via a closed loop feedback system.

15. The system of claim 8, wherein the system is further configured to operate in a pilot mode, wherein the fuel injector delivers a predetermined mixture of air and fuel to the burner assembly under various engine operating conditions, to prevent the flame from being extinguished.

16. The system of claim 5, wherein the regeneration device is configured to increase the temperature of the exhaust flow upstream from the particulate trap, the system further including an upstream temperature sensor configured to measure an upstream temperature of the exhaust flow upstream from the particulate trap;
the controller being further configured to control the regeneration device to thereby regulate the upstream temperature, in a closed loop fashion, based on the upstream temperature measured by the upstream temperature sensor.

17. The system of claim 16, wherein the regeneration device includes a burner assembly configured to create a flame and a fuel injector configured to deliver fuel to the burner assembly, the system being configured to:
regulate the upstream temperature by regulating an amount of fuel supplied to the fuel injector; and
regulate a ratio of air to fuel supplied to the fuel injector.

18. A method of regenerating a particulate trap, comprising:
monitoring three individual aspects of an exhaust flow producing engine and an exhaust system configured to carry exhaust produced by the engine away from the engine, each of the three individual aspects being indicative of an amount of particulate matter in the particulate trap;
wherein each of the three individual aspects is associated with a separate, individual, predetermined threshold, and
wherein, for each of the three individual aspects, a respective trigger condition exists when the respective individual aspect is at, or beyond, the respective predetermined threshold that is associated with the respective individual aspect; and
activating a regeneration device configured to reduce an amount of particulate matter in a particulate trap configured to remove one or more types of particulate matter from the exhaust flow of the engine, in response to at least one of the three individual aspects being determined to meet the respective trigger condition associated therewith.

19. The method of claim 18, wherein the trigger conditions are selected from the group consisting of operation of the engine for a predetermined amount of time; consumption of a predetermined amount of fuel by the engine; detection of an elevated backpressure upstream of the particulate trap above a predetermined pressure; detection of a pressure differential across the particulate trap of greater than a predetermined amount; determination that a calculated amount of particulate matter accumulated in the particulate trap is above a predetermined amount; and activation of a manual trigger.

20. The method of claim 18, wherein the activating of the regeneration device is further conditional on one or more operating parameters of the engine.

21. The method of claim 20, wherein the one or more operating parameters include at least one of engine speed and engine load.

22. The method of claim 18, wherein the regenerating includes increasing a temperature of the particulate trap.

23. The method of claim 22, further including creating a flame with a burner assembly having a fuel injector, the flame being in a heat exchange relationship with the exhaust flow.

24. The method of claim 23, further including:
detecting whether the flame is lit with a flame sensing system associated with the burner assembly;
wherein the detecting includes monitoring at least one of the following:
a temperature in proximity to the flame
an amount of ions in proximity to the flame
a rate of change of the temperature in proximity to the flame;
a rate of change of the amount of ions in proximity to the flame; and
a difference in temperature between an upstream exhaust temperature upstream of the burner assembly and a downstream exhaust temperature downstream of the burner assembly, wherein monitoring the difference in temperature includes determining whether the downstream exhaust temperature exceeds the upstream exhaust temperature by a predetermined amount.

25. The method of claim 23, further comprising cooling the fuel injector while the flame is not lit.

26. The method of claim 23, further including supplying air to the fuel injector and mixing the air with fuel for combustion in the burner assembly, wherein the source of the air is the air intake system of the engine downstream from a compressor configured to create forced induction for the engine.

27. The method of claim 23, further including regulating pressure of fuel supplied to the fuel injector via a closed loop feedback system.

28. The method of claim 22, further including:
increasing the temperature of the exhaust flow upstream from the particulate trap;
measuring an upstream temperature of the exhaust flow upstream from the particulate trap; and
controlling the regeneration device to thereby regulate the upstream temperature, in a closed loop fashion, based on the upstream temperature.

29. The method of claim 28, wherein the regeneration device includes a burner assembly configured to create a flame and a fuel injector configured to deliver fuel to the burner assembly, the method further including:
regulating the upstream temperature by regulating an amount of fuel supplied to the fuel injector; and
regulating a ratio of air to fuel supplied to the fuel injector.

30. A method of regenerating a particulate trap, comprising:
monitoring three aspects of an exhaust flow producing engine and an exhaust system configured to carry exhaust produced by the engine away from the engine;
increasing a temperature of the particulate trap by activating a regeneration device configured to reduce an amount of particulate matter in a particulate trap configured to remove one or more types of particulate matter from the exhaust flow of the engine, in response to at least one of the three aspects being determined to meet a trigger condition;

measuring an upstream temperature of the exhaust flow upstream from the particulate trap;

measuring a downstream temperature of the exhaust flow downstream from the particulate trap;

comparing the upstream temperature with the downstream temperature and generating a fault code if the downstream temperature exceeds the upstream temperature by more than a predetermined amount; and preventing future regeneration attempts and illuminating a warning light if the fault code is generated more than a predetermined number of times.

31. A method of regenerating a particulate trap, comprising:

monitoring three aspects of an exhaust flow producing engine and an exhaust system configured to carry exhaust produced by the engine away from the engine;

activating a regeneration device configured to reduce an amount of particulate matter in a particulate trap configured to remove one or more types of particulate matter from the exhaust flow of the engine, in response to at least one of the three aspects being determined to meet a trigger condition;

wherein the regenerating includes increasing a temperature of the particulate trap by creating a flame with a burner assembly having a fuel injector, the flame being in a heat exchange relationship with the exhaust flow; and flushing the fuel injector with fresh air at one or more of the following times to clear the fuel injector of any debris or unburned fuel:

prior to ignition of the flame; and subsequent to the flame being extinguished.

32. A method of regenerating a particulate trap, comprising:

monitoring three aspects of an exhaust flow producing engine and an exhaust system configured to carry exhaust produced by the engine away from the engine;

activating a regeneration device configured to reduce as amount of particulate matter in a particulate trap configured to remove one or more types of particulate matter from the exhaust flow of the engine, in response to at least one of the three aspects being determined to meet a trigger condition;

wherein the regenerating includes increasing a temperature of the particulate trap by creating a flame with a burner assembly having a fuel injector, the flame being in a heat exchange relationship with the exhaust flow; and operating an ignition source at various times during operation of the system, including after the flame has been extinguished, to ignite fuel delivered to the burner assembly by the fuel injector and to ignite any unburned fuel in the fuel injector after the flame has been extinguished.

33. A machine, comprising:

an exhaust flow producing engine;

a particulate trap configured to remove particulate matter from the exhaust flow produced by the engine;

a pressure differential measurement system configured to measure a pressure differential between an upstream pressure of the exhaust flow upstream from the particulate trap and a downstream pressure of the exhaust flow downstream from the particulate trap;

a particulate loading monitor configured to determine an amount of particulate matter that has accumulated in the particulate trap;

a regeneration device configured to reduce the amount of particulate matter in the particulate trap; and a controller configured to:

determine, by a comparison of an individual operating parameter to a predetermined threshold, whether each of the following trigger conditions has occurred:

the engine has been operated for a predetermined amount of time;

the pressure differential exceeds a predetermined pressure differential; and the amount of particulate matter determined, by the particulate loading monitor, to have accumulated in the particulate trap exceeds a predetermined amount; and activate the regeneration device in response to the first to occur of the three trigger conditions.

34. The machine of claim 33, wherein the activation of the regeneration device is further conditional on one or more operating parameters of the engine, the one or more operating parameters including at least one of engine speed and engine load.

35. The machine of claim 33, wherein the regeneration device is configured to elevate a temperature of the particulate trap, the machine further including:

an upstream temperature sensor configured to measure an upstream temperature of the exhaust flow upstream from the particulate trap; and a downstream temperature sensor configured to measure a downstream temperature of the exhaust flow downstream from the particulate trap;

wherein the controller is configured to compare the upstream temperature with the downstream temperature and generate a fault code if the downstream temperature exceeds the upstream temperature by more than a predetermined amount;

the controller being further configured to prevent future regeneration attempts and illuminate a warning light if the fault code is generated more than a predetermined number of times.

36. The machine of claim 33, wherein the regeneration device is configured to elevate a temperature of the particulate trap and includes a burner assembly having a fuel injector;

the regeneration device being further configured to create a flame, which is in a heat exchange relationship with the exhaust flow.

37. The machine of claim 36, wherein the machine is further configured to flush the fuel injector with fresh air prior to ignition of the flame to clear the fuel injector of any debris and flush the fuel injector with fresh air subsequent to the flame being extinguished to clear the fuel injector of any debris and unburned fuel.

38. The machine of claim 36, wherein the machine is further configured to cool the fuel injector while the flame is not lit.

39. The machine of claim 36, wherein the machine is configured to supply air to the fuel injector to be mixed with fuel for combustion in the burner assembly, wherein the source of the air is the air intake system of the engine downstream from a compressor configured to create forced induction for the engine.

40. The machine of claim 36, wherein the regeneration device includes a burner assembly configured to increase the temperature of the exhaust flow upstream from the particulate trap by creating a flame and a fuel injector configured to deliver fuel to the burner assembly, the system further including an upstream temperature sensor configured to measure an upstream temperature of the exhaust flow upstream from the particulate trap;

the controller being further configured to control the regeneration device to thereby regulate the temperature of the exhaust flow upstream from the particulate trap, in a closed loop fashion, based on the upstream temperature measured by the upstream temperature sensor by regulating an amount of fuel supplied to the fuel injector and a ratio of air to fuel supplied to the fuel injector.

41. The machine of claim 36, wherein the regeneration is conditional on ground speed such that regeneration is prevented if the machine has a ground speed of below a predetermined speed for more than a predetermined amount of time; and     wherein the regeneration is conditional on which gear a transmission of the machine is operating in, such that regeneration is prevented if the transmission is in neutral.

42. The machine of claim 36, wherein the regeneration is conditional on engagement of a parking brake of the machine such that regeneration is prevented if the parking brake is engaged.

43. The machine of claim 36, further including:

a flame sensing system associated with the burner assembly and configured to detect whether the flame is lit;

wherein the flame sensing system includes at least one of the following:

a flame sensor selected from the group consisting of a temperature sensor and an ion sensor, wherein the flame sensing system is configured to measure at least one of:

a condition in proximity to the flame; and         a rate of change of a condition in proximity to the flame; and an upstream temperature sensor configured to measure an upstream exhaust temperature upstream of the burner assembly and a downstream temperature sensor configured to measure a downstream exhaust temperature downstream of the burner assembly, the flame sensing system being configured to determine whether the downstream exhaust temperature exceeds the upstream exhaust temperature by a predetermined amount.

\* \* \* \* \*

UNITED STATES PATENT AND TRADEMARK OFFICE
CERTIFICATE OF CORRECTION

PATENT NO. : 7,406,822 B2  Page 1 of 1
APPLICATION NO. : 11/169750
DATED : August 5, 2008
INVENTOR(S) : Steven Funke It is certified that error appears in the above-identified patent and that said Letters Patent is hereby corrected as shown below:

Column 4, line 43, delete "mote" and insert -- more --.

Column 5, line 7, delete "maybe" and insert -- may be --.

Column 15, line 42, in Claim 32, after "reduce" delete "as" and insert -- an --.

Signed and Sealed this

Twenty-fourth Day of March, 2009

JOHN DOLL
*Acting Director of the United States Patent and Trademark Office*